3,236,786
PROCESS FOR PRODUCING CHLORINATED POLYETHYLENE GLYCOL AND PRODUCT SO PRODUCED
John D. Newkirk, New Haven, and Robert J. Raynor, North Branford, Conn., assignors to Olin Mathieson Chemical Corporation, New Haven, Conn., a corporation of Virginia
No Drawing. Filed Sept. 28, 1962, Ser. No. 227,049
7 Claims. (Cl. 260—2)

This invention relates to a series of polymeric compositions which may be broadly described as condensation polymers of polyethylene glycols. In addition, it is concerned with a novel process for preparing these polymeric compositions.

The polyethylene glycols are inexpensive chemicals which have found application in a great number of industries because they possess a wide variety of physical and chemical properties. The commercially available polyethylene glycols have molecular weights ranging from 200 to 20,000.

The reaction of polyethers with chlorine has been previously described in the literature as, for example, in Belgian Patent 597,240 wherein chlorinated polyethers are prepared. It had been assumed that the available polyethylene glycols could be chlorinated in the same manner to obtain derivatives of commercial interest. However, it was found that the reaction of chlorine with polyethylene glycols under certain conditions proceeds in an entirely different and unexpected manner, and that a new series of polymeric compositions are obtained from the reactions instead of the expected chlorinated glycols.

Therefore, the principal object of this invention was to obtain the novel polymeric compositions resulting from the reaction of chlorine and polyethylene glycols.

Another object of this invention was to provide a simple and efficient process by which the polymers could be readily obtained. Other objects will be apparent from the following discussion.

These objects have been accomplished in accordance with this invention. It has been found that a series of new polymeric compositons may be obtained by reacting chlorine under certain conditions with polyethylene glycols of varying molecular weights. These compositions are insoluble in water and most organic solvents which is in sharp contrast to the solubility characteristics exhibited by the beginning polyethylene glycols. The polymers appear to be condensation products of numerous polyethylene glycol molecules, and they are apparently characterized by a certain amount of cross linking which leads to their insolubility in common solvents.

There are several unique features associated with this reaction of chlorine with the polyethylene glycols. The reaction appears to be specific with polyethylene glycols since no polymers have been obtained when chlorine is reacted under similar conditions with polypropylene glycols. Furthermore, no polymers of the type described herein are obtained when chlorine is reacted with diethylene glycol and triethylene glycol, but instead chlorinated derivatives are obtained as might be conventionally expected. However, when polyethylene glycols having average molecular weights of from about 400 to 20,000 are reacted with chlorine at reaction temperatures up to about 140° C., the novel polymers described herein are obtained. Surprisingly, at temperatures in excess of about 140° C., the reaction products obtained are again essentially highly chlorinated polyethylene glycol derivatives rather than the unique polymeric compositions of this invention.

The mechanism of the reactions described herein is not completely understood, but there is substantial evidence to indicate that the condensation polymer contains a plurality of acetal linkages. It is believed that the first step in the reaction involves chlorine substitution followed by dehydrohalogenation resulting in a molecule with an end aldehyde group. This aldehyde group probably condenses with an unreacted primary alcohol end group to form a hemi-acetal which in turn reacts with an additional primary alcohol end group to form an acetal linkage. The polymeric products of this invention are also characterized by a small amount of chlorine substitution, but in all polymer compositions prepared, this degree of chlorine substitution is limited to an extent of less than 5%.

The nature of the polymeric compositions appears to be determined by two factors. As previously mentioned, condensation polymers are not obtained when chlorine is reacted with polyethylene glycols at temperatures higher than about 140° C. Instead, highly chlorinated derivatives of the polyethylene glycols are obtained at these higher reaction temperatures. Furthermore, the nature of the polymeric products obtained appears to depend upon the molecular weight of the beginning polyethylene glycols. The use of polyethylene glycols having an average molecular weight of from about 400 to about 2,000 results in elastomeric products of a rubber-like nature. When polyethylene glycols having molecular weights from around 4,000 to 20,000 are used in the novel process described herein, the resultant polymeric compositions are tough, resinous solids.

The following examples are included to show more clearly the nature of the products and process described herein. It is to be understood that these examples are illustrative only and are not to be considered as limiting the scope of this invention since obvious modifications would be apparent to those skilled in the art.

*Example 1*

A one-liter resin reaction flask equipped with stirrer, thermometer, gas inlet tube and vent was charged with 740 g. of polyethylene glycol having an average molecular weight of 400. Chlorine gas was passed into the stirred fluid beneath the surface for a five hour period causing an exothermic reaction which maintained the flask contents at a temperature of 60–85° C. without use of external heat sources. The generated hydrogen chloride, as well as unreacted chlorine, were vented from the flask. After a total of 711 g. of chlorine had been introduced into the flask, formation of a clear, colorless, rubbery gel impeded further influx of chlorine and the reaction was terminated. The product, after cooling to room temperature, was a clear elastomeric solid. The solid was triturated at room temperature with tertiary butanol. The alcohol insoluble particles were collected by filtration, washed with ether and dried in vacuo. There was obtained 490 g. of white, elastomeric particles having a chlorine content of 3.20%.

These particles were insoluble in water and in common organic solvents such as methanol and ethanol. This is in contrast to the high degree of solubility in such solvents exhibited by the beginning polyethylene glycol.

The presence of acetal linkages in the polymer was suggested by the following procedure. A reaction flask equipped with stirrer and condenser was charged with 83 g. of the elastomeric product obtained above, 650 ml. of tertiary butanol and 15 mls. of 37% hydrochloric acid. The mixture was at first a slurry, but as it was stirred at reflux temperature, a clear solution was gradually obtained. All volatile materials were then removed in vacuo, and 82 g. of a viscous light yellow oil was obtained. This oil was soluble in water, methanol, acetone and benzene.

A molecular weight determination of this oil was performed by dissolving it in benzene and using a vapor pressure technique (Mechrolab Osmometer). A molecular weight of 2411 was obtained, and this indicated that the original polymeric composition was essentially a product formed by the condensation of six polyethylene glycol units.

The oily hydrolysis product had a hydroxyl number of 176 and a total carbonyl group analysis of 4.4%. Based on the molecular weight of the oil, this data demonstrates that the oily hydrolysis product has a 1:2 ratio of carbonyl groups to hydroxyl groups. This data supports the theory that the original elastomeric product is a polyacetal since each acetal linkage would be expected to yield one carbonyl group and two hydroxyl groups upon hydrolysis.

*Example 2*

A two-liter resin reaction flask equipped with stirrer, thermometer, gas inlet tube and vent was charged with 1261 g. of polyethylene glycol having an average molecular weight of 1,000. Chlorine gas was passed into the stirred fluid beneath the surface for a two hour period at a reaction temperature range of 82 to 115° C. The generated hydrogen chloride, as well as unreacted chlorine, were vented from the flask. After a total of 540 g. of chlorine had been introduced into the flask, the reaction was terminated since the formed rubbery gel impeded further chlorine influx. The reaction mixture was cooled to room temperature, and a clear, colorless, elastomeric solid was obtained in the amount of 1245 g.

The solid was then heated at 50° C./0.5 mm. over potassium hydroxide to remove any residual hydrogen chloride or chlorine entrapped in the solid. The final product was a light yellow elastomer having a chlorine content of 2.71%.

*Example 3*

A 500 ml. resin reaction flask equipped with stirrer, thermometer, gas inlet tube and vent was charged with 200 g. of polyethylene glycol having an average molecular weight of 4,500. Chlorine gas was passed into the stirred fluid below its surface for a 15 minute period at a reaction temperature of 110–133° C. The hydrogen chloride generated in the reaction, as well as unreacted chlorine, were vented from the flask. The reaction was terminated after a total of 45.5 g. of chlorine had been introduced to the flask because formation of a clear, rubbery gel impeded the further influx of chlorine. After cooling the reaction mixture to room temperature, a hard, tough solid was obtained.

This solid was heated over potassium hydroxide at 130–140° C./25 mm. for a two hour period. It was then triturated with benzene at 50° C., and the finely divided benzene insoluble particles were collected by filtration. The particles were triturated again with tertiary butatnol, filtered, washed with ether and dried. There was obtained 146 g. of white, hard, granular particles having a chlorine content of 0.57%.

This material was insoluble in water and other common organic solvents. The beginning polyethylene glycol was, of course, quite soluble in water.

*Example 4*

A 500 ml. resin reaction flask equipped with stirrer, thermometer, gas inlet tube and vent was charged with 228 g. of polyethylene glycol having an average molecular weight of 9500. Chlorine gas was passed into the stirred fluid below its surface for a 30 minute period at a reaction temperature of 100–117° C. Unreacted chlorine and hydrogen chloride were vented from the reaction flask. After a total of 82 g. of chlorine had been introduced into the flask, the resulting rubbery product made it very difficult to introduce any further chlorine, and the reaction was terminated. The product was cooled to room temperature, and a very tough, white, opaque solid was obtained.

The solid was heated at 150° C./25 mm. for a period of two hours to remove volatile material. The final product obtained was a very tough, cellular, foam-like material having a chlorine content of 1.43%.

*Example 5*

A 500 ml. resin reaction flask equipped with stirrer, thermometer, gas inlet tube and vent was charged with 200 g. of polyethylene glycol having an average molecular weight of 20,000. Chlorine gas was passed into the stirred fluid for a 30 minute period at a reaction temperature of 110–130° C. Unreacted chlorine and generated hydrogen chloride were vented from the flask during reaction. After 81 g. of chlorine had been introduced into the flask, no further chlorine could be bubbled in in view of the high viscosity of the reaction product. The product was cooled to room temperature, and a very tough, opaque wax was isolated.

A small amount of entrapped hydrogen cholride and unreacted chlorine was removed from this solid by heating it at 150° C./25 mm. for a two hour period. The physical appearance of the polymeric material did not change as a result of this procedure. The final product had a chlorine content of 1.57%.

The desired polymeric compositions can be obtained by reacting chlorine with the polyethylene glycols at temperatures ranging from room temperature to about 140° C. However, best results are obtained when preferred temperature ranges are utilized. It has been found that when polyethylene glycols of lower molecular weights are used (i.e. those having molecular weights from about 400 to about 2,000), the reaction proceeds very smoothly at reaction temperatures of from 70–100° C. However, polyethylene glycols having molecular weights of from about 3,000 to 20,000 are more readily reacted with chlorine at a range of 100–140° C. because they can be stirred more efficiently at this higher range. As mentioned in the prior discussion, the reactions should not be performed at temperatures in excess of 140° C. since the desired polymeric compositions are not obtained at these higher temperatures. The reactions are fairly exothermic, but they can be readily controlled at a desired temperature range.

The crude polymeric compositions are contaminated with entrapped hydrogen chloride and chlorine as well as small amounts of unreacted polyethylene glycols. Although these crude polymers are useful compositions, it may be desirable to remove the contaminants, and this can be accomplished by two procedures. The first procedure merely involved subjecting the solid polymers to a vacuum treatment to remove volatile contaminants. Some heating can be advantageously utilized during this vacuum treatment, and it is also preferable to strip such volatiles over solid potassium hydroxide to absorb the acidic contaminants.

However, a preferred method of purification has been found to be quite effective. This method is well illustrated in Example 1. Briefly, the technique involves triturating the crude polymers with an organic solvent in which the polymer itself is insoluble. In view of the insolubility of the polymers in most organic solvents, a wide variety of solvents may be used in this procedure. Tertiary butanol and dimethylacetamide are particularly useful since they remove hydrogen chloride very effectively from the compositions. Benzene is also quite effective when used in the trituration procedure. It is preferred to triturate the polymers until relatively small polymeric particles are obtained. After the trituration procedure, the insoluble polymer particles can be readily filtered and dried. At this point, they are relatively free of the aforementioned contaminants.

The novel polymeric compositions of this invention display a remarkable cohesiveness toward glass. For example, the polymers prepared in Examples 3 and 4 were applied in the form of a thin coating to glass plate while still warm (ca. 80° C.). After cooling, the polymeric resins were found to be bonded so tenaciously to the glass surface that, when they were mechanically removed, portions of the glass substrate were removed along with the resinous coating. The polymers are compatible with phenolic resins which themselves lack a high degree of cohesiveness to glass. Therefore, the polymers of this invention are useful as secondary bonding agents in the combining of glass plate or glass flakes with other resins such as phenolics which lack a high degree of cohesiveness to glass. The polymers may be blended with the phenolic or other resins before the mixture is brought into contact with the glass particles, or alternatively, the polymers may be coated on a glass substrate and the subsequent coated surface be made available for further coating with other resins.

The elastomeric polymers prepared from the lower molecular weight polyethylene glycols (i.e., polymers of Examples 1 and 2) are also useful as plasticizers in the information of urethanes. Aside from the usual plasticizing advantages, the acidic nature of the polymers, attributed to the substituted chlorine atoms, helps to modify the rapid urethane reaction rate. The alkaline nature of the polyols and amines used in urethane formulations is a factor in a rapid urethane formation which on occasion leads to processing and handling difficulties. It has been found that the addition of small amounts of the elastomers described herein is useful in controlling too rapid urethane formation.

What is claimed is:

1. A process for preparing chlorine-containing polymerization products which comprises reacting chlorine with polyethylene glycols having an average molecular weight from about 400 to about 20,000 at temperatures of from about 25° C. to about 140° C., the degree of chlorine substitution in the said polymerization products being limited to less than 5%.

2. A process for preparing chlorine-containing polymerization products which comprises reacting chlorine with polyethylene glycols having an average molecular weight from about 400 to about 2,000 at a temperature range of about 70° C. to 120° C., the degree of chlorine substitution in the said polymerization products being limited to less than 5%.

3. A process for preparing chlorine-containing polymerization products which comprises reacting chlorine with polyethylene glycols having an average molecular weight from about 3000 to about 20,000 at a temperature range of about 100° C. to 140° C., the degree of chlorine substitution in the said polymerization products being limited to less than 5%.

4. A process for preparing chlorine-containing polymerization products which comprises reacting chlorine with polyethylene glycols having an average molecular weight from about 400 to about 20,000 at temperatures of from about 25° C. to 140° C., cooling the reaction mixture, triturating the reaction mixture with an organic solvent in which the polymerization product is not soluble, filtering the mixture to remove the insoluble polymerization product and drying the polymerization product, the degree of chlorine substitution in the said polymerization products being limited to less than 5%.

5. The process of claim 4 wherein the organic solvent is chosen from the group consisting of tertiary butanol, dimethyl acetamide and benzene.

6. The process of claim 5 wherein a reaction temperature of about 70° C. to 100° C. is employed for the reaction of polyethylene glycols having an average molecular weight from about 400 to 2,000.

7. The product obtained by the process of claim 1.

References Cited by the Examiner

Otozai et al., Bulletin, Chemical Society of Japan, vol. 27 (1954), pp. 476–477.

WILLIAM H. SHORT, *Primary Examiner.*